(12) United States Patent
Haykal et al.

(10) Patent No.: US 8,996,564 B2
(45) Date of Patent: Mar. 31, 2015

(54) SYSTEM AND METHOD FOR DEPLOYING LOGIC IN DATA FILES

(75) Inventors: Salem Haykal, Bellevue, WA (US); Daniel Herron, Sammamish, WA (US); Jigar Thakkar, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 192 days.

(21) Appl. No.: 12/951,087

(22) Filed: Nov. 22, 2010

(65) Prior Publication Data

US 2012/0131039 A1    May 24, 2012

(51) Int. Cl.
*G06F 7/00*        (2006.01)
*G06F 17/30*     (2006.01)
*G06F 9/445*     (2006.01)

(52) U.S. Cl.
CPC .... *G06F 17/30864* (2013.01); *G06F 17/30979* (2013.01); *G06F 8/65* (2013.01)
USPC ........................................................ 707/769

(58) Field of Classification Search
None
See application file for complete search history.

(56) References Cited

U.S. PATENT DOCUMENTS

| | | | |
|---|---|---|---|
| 6,493,721 B1* | 12/2002 | Getchius et al. | 1/1 |
| 7,143,190 B2 | 11/2006 | Christensen et al. | |
| 7,587,379 B2 | 9/2009 | Huelsman et al. | |
| 2004/0139176 A1 | 7/2004 | Farrell et al. | |
| 2004/0243598 A1* | 12/2004 | Sleeper et al. | 707/100 |
| 2005/0222996 A1* | 10/2005 | Yalamanchi | 707/4 |
| 2007/0226203 A1* | 9/2007 | Adya et al. | 707/4 |
| 2008/0301124 A1* | 12/2008 | Alves et al. | 707/5 |
| 2010/0293523 A1* | 11/2010 | Ahadian et al. | 717/108 |

OTHER PUBLICATIONS

"Microsoft Computer Dictionary", 2002, Microsoft Press, Fifth Edition, pp. 115 and 501.*
Garg, Deepak, "Proof Theory for Authorization Logic and its Application to a Practical File System", Retrieved at << http://www.cs.cmu.edu/~rwh/theses/garg.pdf >>, Dec. 9, 2009, pp. 306.
"JBoss Rules Reference Manual", Retrieved at << http://www.redhat.com/docs/manuals/jboss/jboss-soa-4.2/html-single/JBoss_Rules_Manual/ >>, Feb. 2008, pp. 62.
Brachman, Barry, "Rule-Based Access Control", Retrieved at << http://www.ibm.com/developerworks/webservices/library/ws-soa-access.html >>, Dec. 13, 2006, pp. 8.
"A Guide to Developing and Running Connected Systems with indigo", Retrieved at << http://msdn.microsoft.com/en-us/magazine/cc164026.aspx >>, Retrieved Date: Sep. 15, 2010, pp. 10.
"What's New in Adobe Flex 4", Retrieved at << http://www.adobe-flex-builder.info/whats-new-in-adobe-flex-4/ >>, Retrieved Date:Sep. 15, 2010, pp. 3.
"XAware—XAware.Com Home", Retrieved at << http://www.xaware.com/ >>, Retrieved Date: Sep. 15, 2010, pp. 2.

* cited by examiner

*Primary Examiner* — Usmaan Saeed
*Assistant Examiner* — Michele Choi
(74) *Attorney, Agent, or Firm* — Dave Ream; Jim Ross; Micky Minhas (57) ABSTRACT

One particular technique includes storing logic expressions in a data file. This particular technique also includes executing application code. The executing provided by this particular technique includes receiving a query, reading an individual logic expression from the data file, processing the query using the individual logic expression to determine a query result, and providing the query result in response to the query.

20 Claims, 5 Drawing Sheets

```
<?xml version="1.0" encoding="utf-8" ?>
<PropositionalLogicStack>
<Rule Name="EarlyRejectionRule">
<EvaluationExpression>
  <Expression>                                                               410
    <Modifier>None</Modifier>
    <Expression>                                                             408
      <Modifier>None</Modifier>
      <Evaluator type="ConfidenceLessThan">Flight,0.7</Evaluator>            401
      <Connective>OR</Connective>                                            404
      <Evaluator type="BlacklistMatch">Flight</Evaluator>                    402
    </Expression>
    <Connective>AND</Connective>                                             405
    <Expression>                                                             409
      <Modifier>Not</Modifier>                                               406
      <Evaluator type="WhitelistMatch">Flight</Evaluator>                    403
    </Expression>
  </Expression>
</EvaluationExpression>
<Effectors>
  <Effector type="Stop"></Effector>                                          407
</Effectors>
</Rule>
</PropositionalLogicStack>
```

SYSTEM AND METHOD FOR DEPLOYING LOGIC IN DATA FILES

BACKGROUND

Computer programs often include logic written in source code using programming languages such as Java™, Visual C++™, Visual Basic™, etc. Often, the source code is compiled into a machine-language object file that is specific to a particular computing architecture, and the object files are linked into executable files that are deployed to run on a given computer system. Alternatively, the source code can be deployed without being compiled, and executed using an interpreter or just-in-time compiler resident on the computing system.

Typically, substantial amounts of testing are performed before deploying executable and/or source code. For example, a large-scale project such as a web search engine may have hundreds or thousands of different logic paths with various interdependencies, and the various logic paths are exercised using unit tests or other methodologies before deploying the code. Because of the extensive testing required to deploy computer code, it is often difficult and/or time consuming to release updates to deployed code.

SUMMARY

This document relates to computer programming. One implementation is manifested as a technique that can include storing logic expressions in a data file. The technique can also include executing application code. The executing can include receiving a query, reading an individual logic expression from the data file, and processing the query using the individual logic expression to determine a query result. The technique can also include providing the query result in response to the query.

Another implementation is manifested as one or more computer-readable storage media including instructions which, when executed by one or more processing devices, can cause the one or more processing devices to perform storing logic expressions in a data file and reading a first one of the logic expressions from the data file. The first logic expression can have an associated effector. The instructions can also cause the one or more processing devices to perform receiving a query and evaluating the first logic expression using the query. The instructions can also cause the one or more processing devices to perform, in an instance where the first logic expression evaluates to true, performing the effector and providing a query result in response to the query. The instructions can also cause the one or more processing devices to perform, in an instance where the first logic expression does not evaluate to true, not performing the effector and providing a different query result to the query.

Another implementation is manifested as a system that can include a logic parser configured to parse a data file that includes one or more logic expressions. The system can also include a logic execution component that includes compiled or interpreted application code that is configured to receive a query, receive a first one of the logic expressions from the logic parser, evaluate the query with the first logic expression to determine a result, and process the query consistently with the result. The system can also include at least one processing device that is configured to execute the logic parser or the logic execution component.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This document relates to computer software, and more specifically, to using certain techniques to deploy logic in data files that can be used to control execution of a computer program.

Generally speaking, logic can be deployed in a data file. For example, an extensible markup language ("XML") file can include logic expressions that determine how a computer program executes. A parser can extract the logic expressions from the XML file and provide the extracted logic expressions to the computer program. The computer program can execute according to the logic expressions. Thus, the computer program can be configured to perform different logical operations by providing different logic expressions in the deployed data file.

Figure 1:
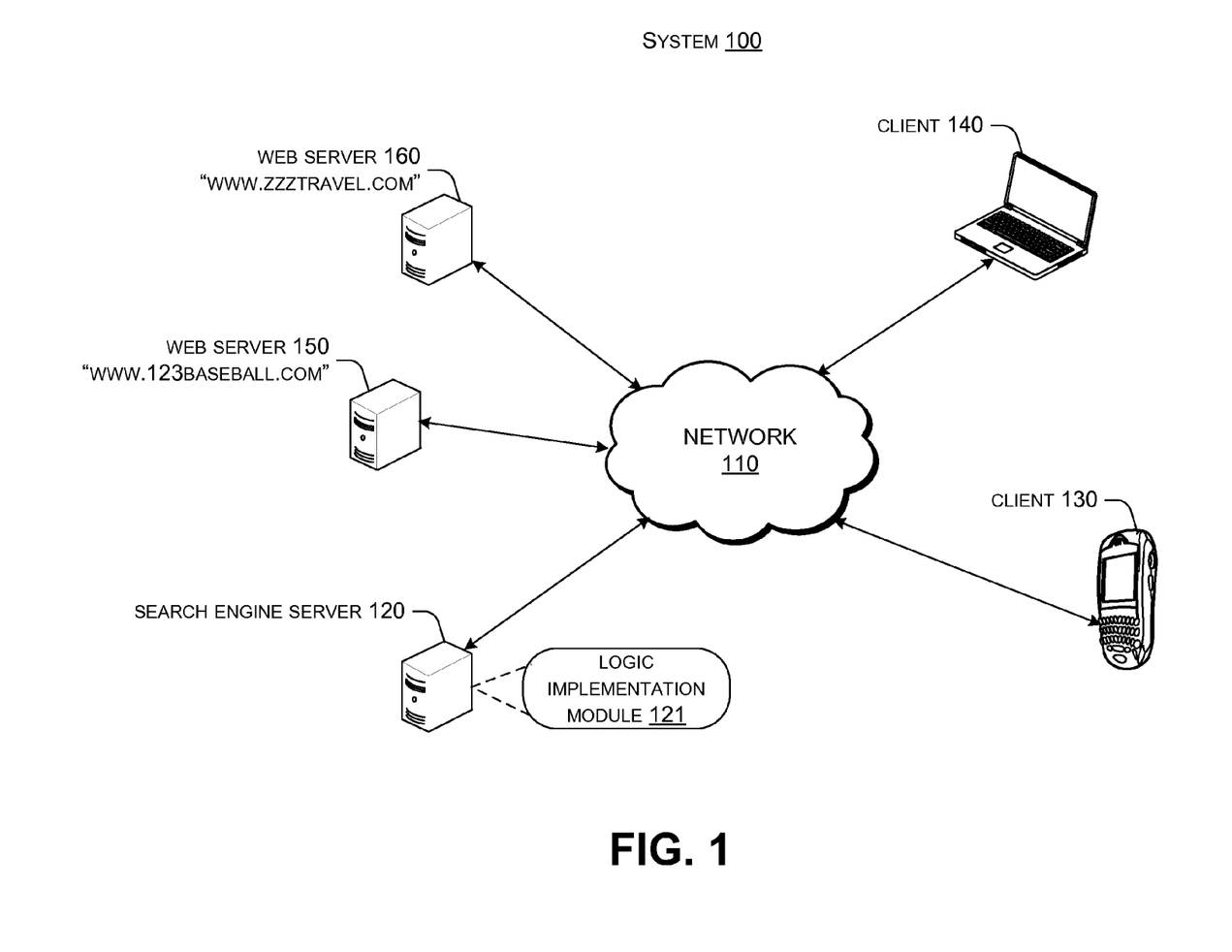
FIG. 1 shows an example of an operating environment in accordance with some implementations of the present concepts.

For purposes of explanation, consider introductory FIG. 1. FIG. 1 shows an exemplary system 100 that is consistent with the disclosed concepts. As shown in FIG. 1, system 100 includes a network 110 connecting numerous devices, such as a search engine server 120, client devices 130 and 140, and web servers 150 and 160. As discussed in more detail below, each device shown in FIG. 1 can include one or more processing devices, such as computer processors, executing instructions in a computer-readable storage medium such as a memory.

Search engine server 120 can include a logic implementation module 121. Generally speaking, logic implementation module 121 can execute logic deployed in data files. The processing performed by search engine server 120 can be reconfigured by providing updated logic files for execution by logic implementation module 121. Note that logic implementation module 121 is provided on search engine server 120 for exemplary purposes. However, logic implementation module 121 can be provided in many different types of computing devices or systems.

In the example shown in FIG. 1, search engine server 120 can be configured to provide web search services to client devices 130 and/or 140. For example, search engine server 120 can be configured to receive queries from client devices 130 and/or 140, and identify various web sites to the requesting client device in response to the query. For example, the web sites can be hosted on web server 150 and/or 160.

In the disclosed implementations, the manner in which search engine server 120 responds to user queries can be modified by deploying new logic to search engine server 120. Logic implementation module 121 can be configured to read the new logic and perform query processing that is consistent with the newly-deployed logic. Thus, query processing by search engine server 120 can be reconfigured by deploying the new logic. In some implementations, search engine server 120 can be reconfigured in this manner without restarting search engine server 120, and/or without deploying new application code to search engine server 120.

Client devices 130 and 140 can be configured to submit queries to search engine server 120. For example, client devices 130 and 140 can access a search portal web site hosted by search engine server 120 and enter various queries into the search portal. Client devices 130 and 140 can receive a list of matching web pages in response to the queries, as well as links to the web pages.

Web servers 150 and 160 can be configured to host one or more web pages. For example, web servers 150 and 160 can host web sites related to sports, travel, news, or other topics. Web servers 150 and 160 can also be configured to register these web pages with search engine server 120. By doing so, web servers 150 and 160 can make the web sites available through the search engine so that users can find the web sites by submitting queries to search engine server 120. For the purposes of the examples in this document, web server 150 can host a sports web site called "www.123baseball.com," while web server 160 can host a travel web site called "www.zzztravel.com."

Figure 2:
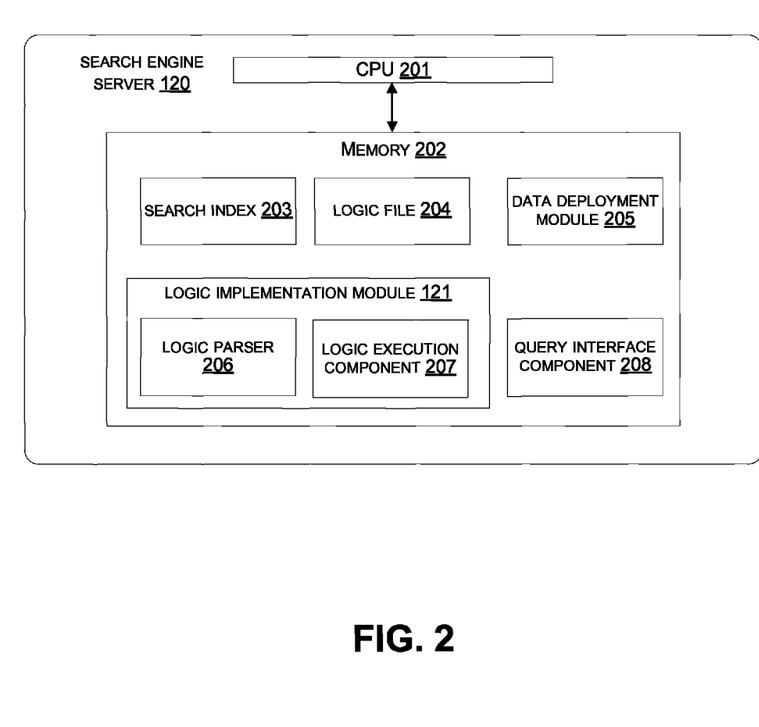
FIG. 2 shows exemplary components of a device in accordance with some implementations of the present concepts.

FIG. 2 shows an exemplary architecture of search engine server 120 that is configured to accomplish the concepts described above and below. Search engine server 120 can include a central processing unit ("CPU") 201 operably connected to a memory 202. For example, CPU 201 can be a reduced instruction set computing (RISC) or complex instruction set computing (CISC) microprocessor that is connected to memory 202 via a bus. Memory 202 can be a volatile storage device such as a random access memory (RAM), or non-volatile memory such as FLASH memory. Although not shown in FIG. 2, search engine server 120 can also include various input/output devices, e.g., keyboard, mouse, display, printer, etc. Furthermore, search engine server 120 can include one or more non-volatile storage media, such as a hard disc drive (HDD), optical (compact disc/digital video disc) drive, tape drive, or other storage devices. Generally speaking, any data processed by search engine server 120 can be stored in memory 202, and can also be committed to non-volatile storage. In some implementations, client devices 130 and 140 and web site servers 150 and 160 can have similar hardware components as search engine server 120.

Memory 202 of search engine server 120 can include various components that can perform certain processing described herein. For example, memory 202 can include a search index 203, which can index various web sites or individual web pages by search terms. Memory 202 can also include logic file 204, which can include logical expressions and/or operators that are executed by logic implementation module 121. Memory can also include a data deployment module 205, which can be configured to deploy data to search engine server 120. For example, data deployment module 205 can be configured to update and/or replace search index 203 and/or logic file 204.

As discussed, search engine server 120 can also include logic implementation module 121. Logic implementation module 121 can include logic parser 206, which can be configured to parse logic file 204 to identify logical expressions included therein. Logic execution component 207 can be configured to receive the parsed logical expressions from logic parser 206, and process received queries based on the parsed logical expressions. Query interface component 208 can be configured to interface with client devices 130 and 140. For example, query interface component 208 can be configured to extract search terms from queries received from client devices 130 and/or 140. Query interface component 208 can also be configured to format search results that are identified by logic implementation module 121, and send the formatted search results to client devices 130 and/or 140.

Note that logic implementation module 121 is described below with respect to implementations on search engine server 120. However, logic implementation module 121 can be embodied on various types of devices. For example, logic implementation module 121 can also be embodied on other processing devices such as a personal computer (PC), laptop, cell phone, personal digital assistant ("PDA"), etc.

Moreover, logic implementation module 121 can be used in contexts other than a web search engine. For example, logic implementation module 121 can be implemented in other systems where application code is deployed on a client or server device. By including logic implementation module 121 on such a device, updated logic can be deployed to the device in the form of a data file. This can be less time-consuming and less expensive than deploying updated application code.

Moreover, the functionality described herein with respect to logic implementation module 121 can be distributed across multiple devices. For example, logic parser 206 could be embodied on one device, and logic execution component 207 could be embodied on another device. Furthermore, logic implementation module 121 or the individual components thereof (206 and 207) can be distributed across multiple devices, e.g., in a server farm, one or more server racks, across several web or application servers, etc.

Figure 3:
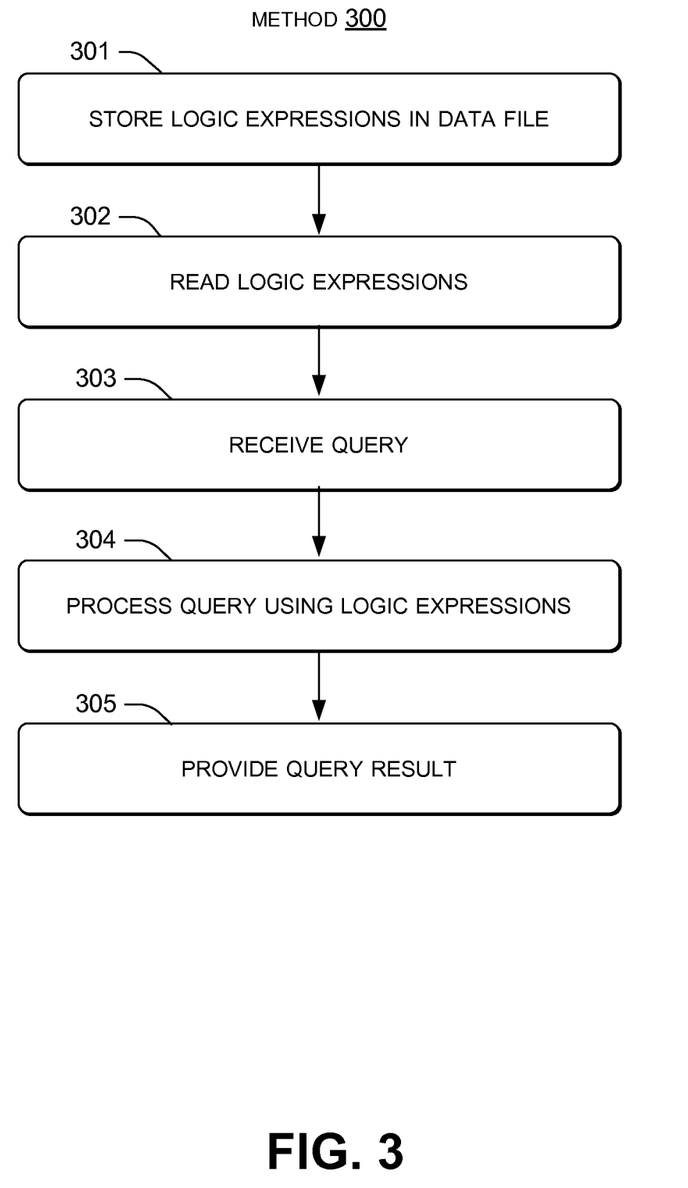
FIGS. 3 and 5 show flowcharts of exemplary methods that can be accomplished in accordance with some implementations of the present concepts.

FIG. 3 illustrates an exemplary method 300, suitable for implementation in system 100 or other systems. Search engine server 120 can implement method 300, as discussed below. Note that method 300 is discussed herein as being implemented on search engine server 120 for exemplary purposes, but is suitable for implementation on many different types of devices.

Logic expressions can be stored in a data file at block 301. For example, data deployment module 205 can store logic file 204 on search engine server 120. Logic file 204 can include logic expressions that can be evaluated by search engine server 120, as discussed in more detail below.

The logic expressions can be read from the data file at block 302. For example, logic parser 206 can read logic file 204 and the logic expressions included therein. Logic parser 206 can also extract one or more of the logic expressions from logic file 204 as part of the processing performed at block 302.

A query can be received at block 303. For example, search engine server 120 can receive a query from client device 130 and/or 140. For the purposes of example, the query can include individual terms "Baltimore" and "Bluesox," which may collectively refer to a baseball team known as the Baltimore Bluesox.

The query can be processed using the parsed logic expressions at block 304. For example, logic implementation module 121 can process the query using the parsed logic expressions to determine a query result. Web sites that match the query can be identified from search index 203. The query result can vary depending on the logic expressions in logic file 204. For example, the logic expressions can indicate whether websites hosted by web servers 150 and/or 160 are included in the query result.

Here, the example query includes the location term "Baltimore." Logic file 204 can include a logical expression that indicates that travel results such as "www.zzztravel.com" should be included by logic implementation module 121 in search results for particular types of queries. For example, the logical expression can indicate that queries including a location term should include travel results in the query result. If such a logical expression is included in logic file 204, then "www.zzztravel.com" can be included in the query result. However, if the logical expression indicates that travel results should not be provided, the query result can be limited by logic implementation module 121 to other web sites with the query term "Baltimore." For example, the query result can include sports web sites such as "www.123baseball.com."

Query results can be provided at block 305. For example, query interface component 208 can receive the search results from logic implementation module 121, and provide them in response to the user query. Thus, if logic file 204 indicates that travel results should be included in the query result, the user can receive both "www.zzztravel.com" and "www.123baseball.com" in response to their query. In contrast, if logic file 204 does not indicate that the travel results should be included, the user may receive "www.123baseball.com" but not "www.zzztravel.com" in the results.

Note that, using the concepts discussed herein, the results provided to the user for the query can be selectively varied by deploying a new version of logic file 204. In some implementations, logic file 204 is a data file, such as an XML file, while logic execution component 207 includes executable code or interpreted source code. In such implementations, the processing performed by logic execution component 207 for particular queries can be changed without having to change the associated executable or interpreted code.

Deploying logic expressions in data files, as discussed herein, can be beneficial for several reasons. Deployment of new code to search engine server 120 may involve extensive testing and validation of the code, which can take a long time and be relatively expensive. In contrast, deploying new data to search engine server 120 may be relatively inexpensive and can be performed relatively quickly. Thus, by deploying a change to a logic expression in logic file 204, processing performed by logic implementation module 121 can be modified without recoding logic implementation module 121.

Note also that there is not necessarily a "correct" answer as to which results should be included in response to a particular query. From the perspective of search engine server 120, it may be difficult to determine from a short query string such as "Baltimore Bluesox" whether the user is interested in travelling. Some users who enter such a query may prefer to receive sports-only results for the query, whereas other users may prefer to receive options to travel to see the Baltimore Bluesox.

Using the disclosed implementations, it may be relatively easy to conduct experiments to identify preferred logic for processing certain queries. For example, consider a first logic file that indicates travel-related results should always be provided in responses to queries that include location terms, and a second logic file that indicates that at least one other travel-related term (e.g., "airplane," "hotel," etc.) should be included in the query before any travel-related results are provided. Experiments can be conducted by measuring click-through rates for the results provided by the first and second logic files.

If travel-related sites have a high click-through rate when using the first logic file, this suggests that users do indeed prefer receiving the travel-related results even when they have provided only a location term without other travel-related terms. Under these circumstances, it may be beneficial to deploy the first logic file to search engine server 120. However, if users are not clicking on the travel-related results very often, this suggests that users may prefer not receiving the travel-related results unless they have provided more travel-specific query terms. Under these circumstances, it may be desirable to deploy the second logic file to search engine server 120.

By conducting various experiments as discussed above, e.g., deploying different logic files and measuring the results, it is possible to identify preferred logic for search engine server 120. Furthermore, the preferred logic can be identified without having to restart logic implementation module 121. Moreover, the preferred logic can be deployed without recompiling or reinterpreting application code associated with logic implementation module 121. Rather, the logic changes can be deployed as part of logic expressions in a data file that indicate how additional queries are to be processed.

Once preferred logic is identified, for example, by experimentation with different logic files, the preferred logic can be embodied as application code. For example, software developers could implement logic from the preferred logic file (e.g., XML) into application code using a programming language such as Java™, Visual C++™, Visual Basic™, etc. The application code can be deployed to search engine server 120 for execution and/or interpretation. Alternatively, the preferred logic can be implemented by storing the preferred logic file on search engine server 120, without needing to modify any application code or even without restarting search engine server 120.

Logic File Formatting, Parsing, and Execution

Figure 4:
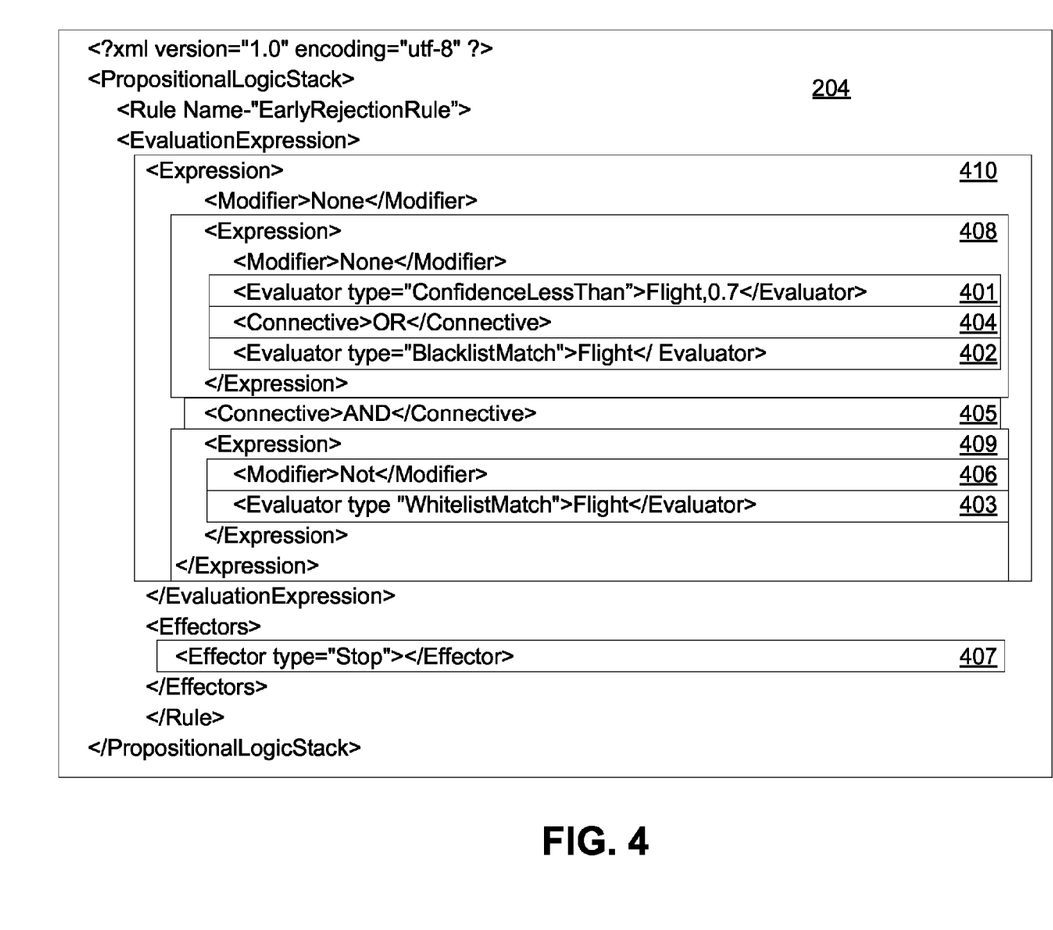
FIG. 4 shows an exemplary data structure in accordance with some implementations of the present concepts.

FIG. 4 illustrates an exemplary logic file 204 that is consistent with the disclosed implementations. Logic file 204 illustrates an implementation where logic expressions are included in an XML file. For example, the XML in logic file 204 can correspond to one or more propositional logic statements. Generally speaking, logic file 204 can include various elements, including expressions, evaluators, connectives, modifiers, and effectors, shown here in XML. One or more propositional logic statements can be combined into a propositional logic rule, and these rules can be represented by the elements of logic file 204.

Evaluators can be simple and, in some cases, indivisible elements that are combined to produce more complex expressions. The combined evaluators can be used in evaluating a logic expression. FIG. 4 illustrates exemplary evaluators 401, 402, and 403. Evaluator 401 has a type "ConfidenceLessThan" with evaluator parameters of "Flight" and "0.7." Generally speaking, evaluator 401 can indicate that a Flight classifier of logic execution component 207 should evaluate the user query to determine a confidence level that the user is requesting flight information. If the confidence is less than 0.7, evaluator 401 can be processed by logic execution component 207 to return a Boolean value of "false" or "0." Otherwise, evaluator 401 can be processed to return a value of "true" or "1."

Evaluator 402 can indicate that logic execution component 207 should determine whether the query includes a term that is on a blacklist associated with the Flight classifier. If so, evaluator 402 can be processed by logic execution component 207 to return a Boolean value of "true" or "1," and otherwise, to return a value of "false" or "0." Evaluator 403 can be similar to evaluator 402, and can return a value of "true" or "1" when the query includes a term that is on a whitelist associated with the Flight classifier.

Connectives can be elements of logic file 204 that are used to link evaluators together. Exemplary connectives can include "AND," "OR," "XOR" (exclusive or), etc. FIG. 4 illustrates a connective 404 that connects evaluators 401 and 402, e.g., an "OR" connective. FIG. 4 also illustrates a connective 405 ("AND") that connects evaluator 403 to an expression that includes evaluators 401 and 402, as well as connective 405.

Modifiers can be elements of logic file 204 that are used to modify the evaluation result of one or more evaluators. Examples include "always TRUE", "always FALSE", and "NOT." FIG. 4 illustrates a "NOT" modifier 406 that modifies evaluator 403.

Evaluators, connectives, and modifiers can be combined into expressions that can also evaluate to true or false. For example, note that evaluators 401 and 402 and connective 404 are part of an expression 408, while modifier 406 and evaluator 403 are part of another expression 409. Both expressions 408 and 409 are part of expression 410.

Effectors can be elements of logic file 204 that are used by logic implementation module 121 to fulfill service responses. One or more effectors can be part of a propositional logic expression so they are invoked when the logic expression evaluates to true. FIG. 4 illustrates a "Stop" effector 407 which indicates that, under certain circumstances, a flight service module that provides flight information should stop evaluating a user query. In some implementations, service modules can include classifiers such as the flight classifier discussed above. Service modules, classifiers, and/or effectors can be implemented as compiled or interpreted application code. Thus, effector 407 can be performed when expression 410 evaluates to true, resulting in execution of the application code that implements the flight service module.

Taken together, logic file 204 indicates a set of steps that can be followed by logic execution component 207 to selectively perform effector 407, e.g., stop the flight service module from processing the query. Here, the flight service module is instructed to stop processing a query when (1) the flight classifier has a confidence of less than 0.7 or the query includes a term on the flight classifier blacklist (e.g., expression 408), and (2) the query does not include a term that is on the flight classifier whitelist (e.g., expression 409).

Figure 5:
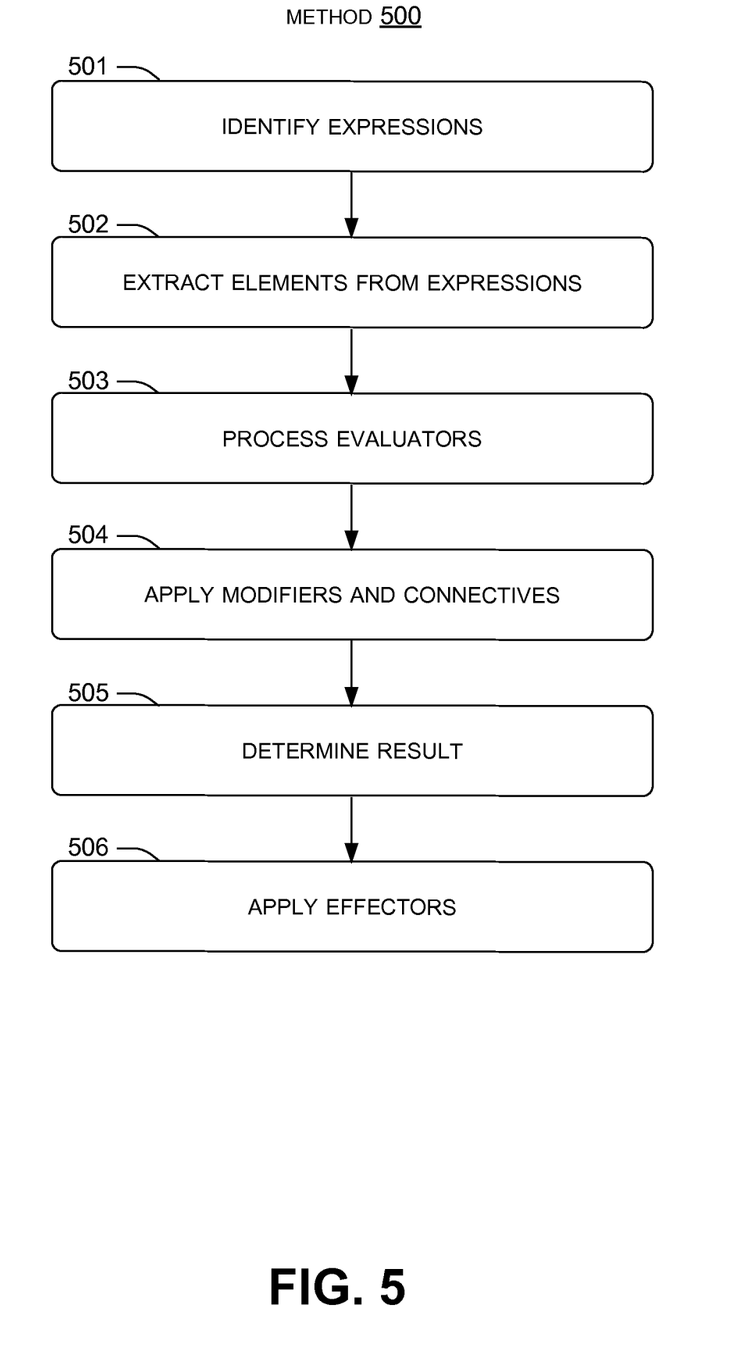

FIG. 5 illustrates an exemplary method 500 for processing or evaluating a query using a logic file, suitable for implementation in system 100 or other systems. In some implementations, method 500 can be performed as part of block 304 of method 300. Search engine server 120 can implement method 500, as discussed below. Note that method 500 is discussed herein as being implemented on search engine server 120 for exemplary purposes, but is suitable for implementation on many different types of devices.

Expressions can be identified in a logic file at block 501. For example, logic parser 206 can identify expressions such as 408, 409, and 410 in logic file 204. In the implementation shown in FIG. 4, XML tags are used to delimit (or separate) elements of the logic file, e.g., expressions, connectives, modifiers, evaluators, and effectors. Thus, logic parser 206 can use the XML tags to identify each expression. However, in other implementations, elements of logic file 204 can be grouped using other delimiters, such as brackets, parentheses, semicolons or colons, indentation, etc., depending on the syntax of logic file 204.

Elements can be extracted from the expressions at block 502. For example, logic parser 206 can extract evaluators 401 and 402 and connective 404 from expression 408. Likewise, logic parser 206 can extract evaluator 403 and modifier 406 from expression 409, and can extract expressions 408 and 409 and connective 405 from expression 410.

The evaluators can be processed at block 503. For example, logic execution component 207 can receive the extracted logic elements from logic parser 206, and process evaluators 401, 402, and 403 using a Flight service module. Evaluator 401 can be processed by a classifier associated with the Flight service module, evaluator 402 can be processed using a blacklist associated with the Flight service module, and evaluator 403 can be processed using a whitelist associated with the Flight service module.

Modifiers and connectives can be applied at block 504. For example, logic execution component 207 can apply the extracted modifiers and connectives based on the nested order of the expressions. Thus, connective 404 can be applied to evaluators 401 and 402 to evaluate expression 408, and modifier 406 can be applied next to evaluator 403 to evaluate expression 409. In addition, connective 405 can be applied to the result of expressions 408 and 409 to evaluate expression 410.

A result of evaluating the expression can be determined at block 505. For example, logic execution component 207 can determine the result of applying the query to expression 410 of logic file 204. If, for example, the confidence for the query provided by the Flight classifier is less than 0.7, or the query includes a term on the Flight service module blacklist, the result will be "true" unless the query also includes a term on the whitelist. As another example, the result will be false if the query includes a term on the whitelist.

Effectors can be applied at block 506. For example, logic execution module 207 can apply effector 407 in instances where expression 410 evaluates to "true." As discussed above, this can cause logic execution module 207 to stop processing the query with the Flight service module.

In instances where expression 410 evaluates to "false," the effector is not applied, and the query is evaluated with the Flight service module. Thus, the user can receive query results that include flights to a location included in the query. In instances where the effector is applied, the effector can stop the Flight service module from evaluating the query. In such instances, the user can receive different query results, e.g., query results that do not relate to flights but otherwise relate to a location included in the query.

Note that, although FIG. 4 illustrates only one effector, multiple effectors can be performed based on the evaluation of a single expression. Furthermore, expressions can be chained together such that one effector follows another. In some implementations, effectors can have side effects on subsequent evaluators in logic file 204. For example, effectors could be used to initialize a query response, extract one or more entities of a query, set certain fields in a query response, stop or continue processing a query with a particular service, etc. Depending on how the various elements of logic file 204 are arranged, different processing results can be obtained for different queries.

Note also that it can be relatively easy to redeploy new logic to search engine server 120. For example, suppose an administrator of search engine server 120 wants to test some new logic that does not use the Flight service module whitelist. The administrator can simply edit and/or replace logic file 204 to delete expression 409. This can be a more time and cost efficient process than coding application software to achieve the same goal, because the administrator needs only to change data (logic file 204), and not application code, associated with the search engine.

Conclusion

Although techniques, methods, devices, systems, etc., pertaining to the above implementations are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. One or more computer-readable storage devices storing instructions which, when executed by one or more processing devices, cause the one or more processing devices to perform acts comprising:
storing a data file comprising a logic expression;
in a first instance:
executing application code that includes a plurality of executable components, the executing comprising:
receiving a first query that does not include the logic expression and is not included in the data file;
reading the logic expression from the data file, the logic expression identifying a first executable component of the application code and a second executable component of the application code;
processing the first query that does not include the logic expression using both the first executable component and the second executable component to determine a first logical result of the logic expression; and
based on the first logical result of the logic expression, providing a first query result in response to the first query that does not include the logic expression; and
in a second instance, while continuing to execute the application code and without restarting the application code:
receiving a second query that does not include the logic expression and is not included in the data file;
reading the logic expression from the data file again and detecting that the logic expression no longer identifies the second executable component;
responsive to detecting that the logic expression no longer identifies the second executable component, processing the second query that does not include the logic expression using the first executable component and not the second executable component to determine a second logical result of the logic expression; and
based on the second logical result of the logic expression, providing a second query result in response to the second query that does not include the logic expression,
wherein the application code is executed without interpreting or compiling the logic expression.

2. The one or more computer-readable storage devices of claim 1, the acts further comprising:
in the first instance, processing the first query with a specific module of the application code; and
in the second instance, stopping the specific module of the application code from processing the second query.

3. The one or more computer-readable storage devices of claim 1, wherein the logic expression includes multiple other logic expressions connected by a logical AND operation and the processing the first query includes determining other logical results of the multiple other logic expressions and performing the logical AND operation on the other logical results.

4. The one or more computer-readable storage devices of claim 3, wherein the first logical result, the second logical result, and the other logical results are Boolean values.

5. The one or more computer-readable storage devices of claim 4, the acts further comprising parsing the data file in the first instance to identify XML tags delimiting the multiple other logic expressions that are included in the logic expression.

6. The one or more computer-readable storage devices of claim 1, wherein the first query and the second query are expressed in a natural language.

7. The one or more computer-readable storage devices of claim 6, wherein the first query result is a first list of web pages matching the first query and the second query result is a second list of web pages matching the second query.

8. A method implemented by at least one processing device, the method comprising:
obtaining a data file comprising a logic expression;
executing application code that includes a plurality of executable components;
in a first instance, while executing the application code:
receiving a first query that does not include the logic expression and is not included in the data file;
reading the logic expression from the data file, the logic expression identifying a first executable component of the application code and a second executable component of the application code;
processing the first query using both the first executable component and the second executable component to determine a first logical result of the logic expression; and
based on the first logical result of the logic expression, providing a first query result in response to the first query; and
in a second instance, while continuing to execute the application code and without restarting the application code:
receiving a second query that does not include the logic expression and is not included in the data file;
reading the logic expression from the data file again and detecting that the logic expression no longer identifies the second executable component;
responsive to detecting that the logic expression no longer identifies the second executable component, processing the second query using the first executable component and not the second executable component to determine a second logical result of the logic expression; and
based on the second logical result of the logic expression, providing a second query result in response to the second query,
wherein the application code is executed without interpreting or compiling the logic expression.

9. The method of claim 8, wherein the second executable component is a whitelist that identifies specific terms which, when included in the first query, cause the whitelist to evaluate to true.

10. The method of claim 8, further comprising selectively executing a service module of the application code based on a plurality of logical results of executing the application code, the plurality of logical results including the first logical result and the second logical result.

11. The method of claim 10, further comprising stopping the service module from executing when individual logical results are true and executing the service module when other individual logical results are false.

12. The method of claim 8, wherein processing the first query comprises identifying other logic expressions included in the logic expression and performing a logical AND operation on other logical results of the other logic expressions.

13. The method of claim 12, wherein processing the first query comprises identifying other logic expressions included in the logic expression and performing a logical OR operation on other logical results of the other logic expressions.

14. A system including one or more processing devices and one or more computer-readable storage devices storing instructions which, when executed by the one or more processing devices, cause the one or more processing devices to:
   store a data file comprising a logic expression;
   execute application code comprising a plurality of executable components;
   in a first instance of executing the application code:
      receive a first query that does not include the logic expression and is not included in the data file;
      read the logic expression from the data file, the logic expression identifying a first executable component of the application code and a second executable component of the application code;
      process the first query using both the first executable component and the second executable component to determine a first logical result of the logic expression; and
      based on the first logical result of the logic expression, provide a first query result in response to the first query; and
   in a second instance of executing the application code without restarting the application code after the first instance:
      receive a second query that does not include the logic expression and is not included in the data file;
      read the logic expression from the data file again and detect that the logic expression no longer identifies the second executable component;
      responsive to a determination that the logic expression no longer identifies the second executable component, process the second query using the first executable component and not the second executable component to determine a second logical result of the logic expression; and
      based on the second logical result of the logic expression, provide a second query result in response to the second query,
   wherein the application code is executed without interpreting or compiling the logic expression.

15. The system of claim 14, wherein the logic expression is provided in the data file in a markup language.

16. The system of claim 15, wherein the markup language is Extensible Markup Language (XML).

17. The system of claim 15, wherein the instructions cause the one or more processing devices to parse the data file by using markup language tags in the data file to identify the logic expression.

18. The system of claim 14, wherein the first logical result and the second logical result are Boolean values.

19. The system of claim 18, wherein the instructions cause the one or more processing devices to:
   determine other Boolean values of other logic expressions included in the logic expression; and
   combine the other Boolean values to determine the first logical result and the second logical result.

20. The system of claim 19, wherein the instructions cause the one or more processing devices to negate an individual other Boolean value based on a modifier included in the logic expression.

* * * * *